(12) United States Patent
Sato et al.

(10) Patent No.: US 6,189,860 B1
(45) Date of Patent: Feb. 20, 2001

(54) PLASTIC BUTTERFLY VALVE

(75) Inventors: Shinji Sato; Takahiro Kato, both of Nobeoka (JP)

(73) Assignee: Asahi Organic Chemicals Industry Co., Ltd., Miyazaki (JP)

( * ) Notice: Under 35 U.S.C. 154(b), the term of this patent shall be extended for 0 days.

(21) Appl. No.: 09/194,740

(22) PCT Filed: Apr. 8, 1998

(86) PCT No.: PCT/JP98/01619

§ 371 Date: Dec. 2, 1998

§ 102(e) Date: Dec. 2, 1998

(87) PCT Pub. No.: WO98/46917

PCT Pub. Date: Oct. 22, 1998

(30) Foreign Application Priority Data

Apr. 14, 1997 (JP) .................................................. 9-095899

(51) Int. Cl.[7] ........................................................ F16K 1/22
(52) U.S. Cl. ............................................ 251/306; 251/305
(58) Field of Search ..................................... 251/305, 306

(56) References Cited

U.S. PATENT DOCUMENTS

| | | | |
|---|---|---|---|
| 4,083,529 | 4/1978 | Santy et al. . | |
| 4,231,546 | * 11/1980 | Eggleston et al. | ..... 251/173 |
| 4,289,296 | * 9/1981 | Krause | ..... 251/306 |
| 4,813,650 | * 3/1989 | Digler | ..... 251/360 |

FOREIGN PATENT DOCUMENTS

| | | |
|---|---|---|
| 4-10168 | 1/1992 | (JP) . |
| 4-32363 | 3/1992 | (JP) . |

* cited by examiner

Primary Examiner—Kevin Shaver
Assistant Examiner—David A. Bonderer
(74) Attorney, Agent, or Firm—Burns, Doane, Swecker & Mathis, L.L.P.

(57) ABSTRACT

A plastic butterfly valve includes a hollow cylindrical body in which an annular seat is fixed on the inner peripheral surface of a flow passage of the body by a seat pressure foot, and a valve disk rotatably and eccentrically supported at the stem of the valve disk within the body to abut the periphery of the valve disk on the seat. The seat pressure foot is detachably fitted in one side portion of the body by an insertion/rotation mechanism. The insertion/rotation mechanism includes a plurality of circular arc projections on the outer peripheral end surface of the seat pressure foot, arcuate cutout portions arranged at positions corresponding to the projections in the body, and an engaging groove on the interior sides of the cutout groove on the interior sides of the cutout portions to guide the projections. By using the insertion/rotation mechanism, mounting and demounting the seat on and from the body can be easily carried out and assembling of the seat and the body can be carried out in a short time.

18 Claims, 6 Drawing Sheets

PLASTIC BUTTERFLY VALVE

TECHNICAL FIELD

The present invention relates to a plastic butterfly valve preferably used in a piping line for a chemical plant, a city water supply or the like and more particularly, to a plastic butterfly valve in which the seat can be easily mounted and demounted in a short time.

BACKGROUND ART

Hitherto, in an eccentric type metallic butterfly valve, a method, as shown in FIG. 7, where a cylindrical seat pressure foot 21 is mounted on a body 20 by fixing bolts 23 so that a seat 22 is fixed to the body 20, has been adopted. Also, in a plastic valve, a method as shown in FIG. 8, where a seat pressure foot 25 provided with a tapered projection 28 is pushed into a circular hole portion of a body 24 having an inner diameter slightly smaller than the outer diameter of the tapered projection 28 and provided with an annular projection 27 so that a seat 26 is fixed to the body 24, has been adopted.

However, in the former butterfly valve, the body must be tapped with tapped holes for bolts to fix the seat pressure foot, thus not only does the cost increase as a result of an increase of working processes, but also a long time is required for fastening the bolts, thus the efficiency of the assembling work is deteriorated.

On the other hand, in the latter butterfly valve, the seat pressure foot is pushed in from the side of the body, thus it is possible that the engaging regions between the seat pressure foot and the body are damaged during disassembly. Thus, in fact, exchanging the seat on-site is impossible, with the result of that the time and the cost of maintenance are increased.

DISCLOSURE OF THE INVENTION

The present invention has been conceived in view of the problems of the conventional technique as stated above and the purpose of this invention is to provide a plastic butterfly valve that does not require the tapped holes in the body and the seat pressure foot, it is not possible to damage the engaging regions during disassembly, and the mounting and the demounting the seat can be easily and rapidly carried out.

The present invention has been conceived in view of the above conventional technique, and relates to an eccentric type plastic butterfly valve characterized in that a seat pressure foot is detachably fitted in the side portion of a body by insertion/rotation means (that is, by a bayonet manner) so that the seat can be easily mounted and demounted in a short time.

A fitting arrangement by the insertion/rotation means (the bayonet manner) in the present invention consist in the following. First, the construction of the seat pressure foot will be explained.

The seat pressure foot is formed with a plurality of arcuate projections at the outer peripheral end surface and is provided with a step portion fitting on and holding the seat at the inner peripheral side of the seat pressure foot.

Next, the construction of a hollow cylindrical body will be explained.

On one side portion of the body is provided arcuate cutout step portions of the same diameter as that of the seat pressure foot, in which the seat pressure foot and the seat are fitted.

The cutout step portion is diametrically provided with arcuate cutout portions having enlarged diameters in which the arcuate projections are fitted, in positions corresponding to the circular arc projections of the seat pressure foot, and is provided at the interior sides of the cutout portions with an annular engaging groove in which the arcuate projections of the seat pressure foot, the foot having been inserted, are circumferentially guided.

In the fitting of both members, first the seat is fitted in the step portion of the seat pressure foot to fit the arcuate projections provided on the outer peripheral end surface of the seat pressure foot into the arcuate cutout portions provided on the side portion of the body. Then, the seat pressure foot is pushed in until the interior side of the seat fitted in the seat pressure foot comes in contact with the interior bottom portion of the arcuate cutout step portions of the body while the seat pressure foot is circumferentially rotated to guide the arcuate projections in the annular engaging groove of the body.

In this way, the seat pressure foot and the seat are fixed on the body. This fitting manner is referred to as insertion/rotation means (bayonet manner) in the present invention.

At least two of the arcuate projections must be provided on the outer peripheral end surface of the seat pressure foot, and the number of the arcuate projections may be suitably selected depending on the size of the diameter of the passage of the butterfly valve. Also, the width of the projections (the length in the axial direction of the seat pressure foot) must be smaller than the thickness of the seat pressure foot, and may be preferably set to 40 to 50% of the thickness of the seat pressure foot.

Further, the forming process of the projections is desirably an integral molding, although any of an integral molding, a fitting manner, a bonding or the like may be used.

The material used in the butterfly valve in the present invention may be any available plastic, and generally hard vinyl chloride resin, polypropylene, and fluorocarbon resin such as PVDF are preferred.

BEST MODE OF CARRYING OUT THE INVENTION

Embodiments of the present invention will be explained below on the basis of the drawings.

Figure 1:
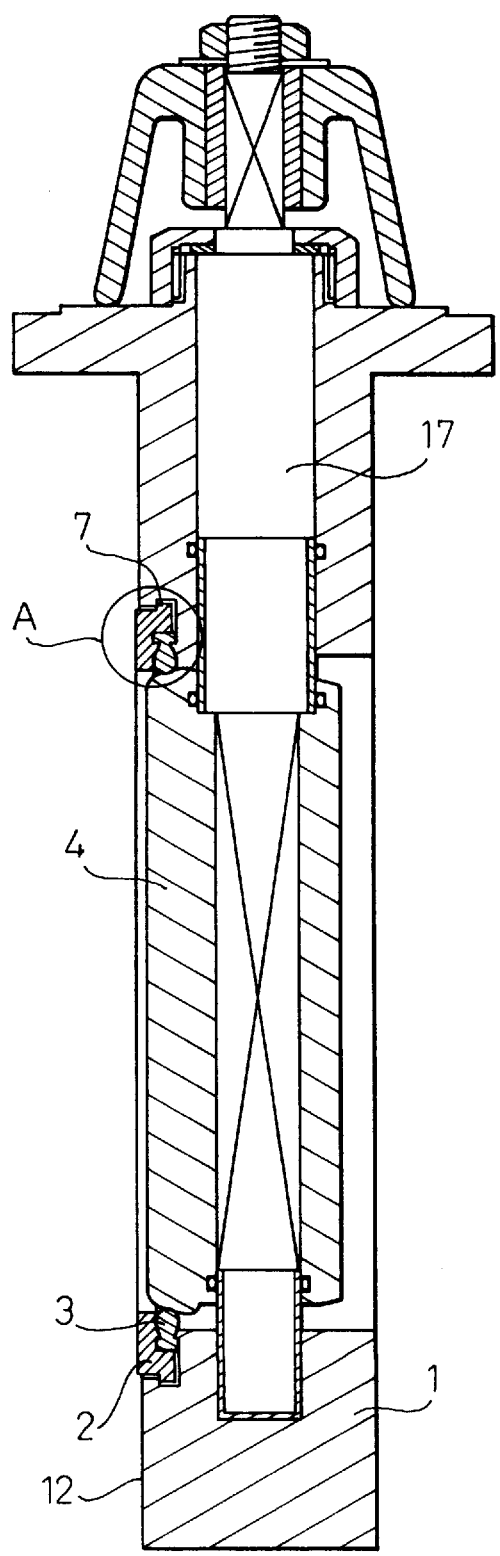
FIG. 1 is a longitudinal section showing an embodiment of the present invention.

FIG. 1 is a longitudinal section showing the closed state of an eccentric type butterfly valve made of vinyl chloride resin, according to the present invention.

In FIG. 1, reference numeral 1 is a hollow cylindrical body, in the interior of which a flow passage is formed and a valve disk 4 is eccentrically and rotatably supported by a stem 17.

Figure 2:
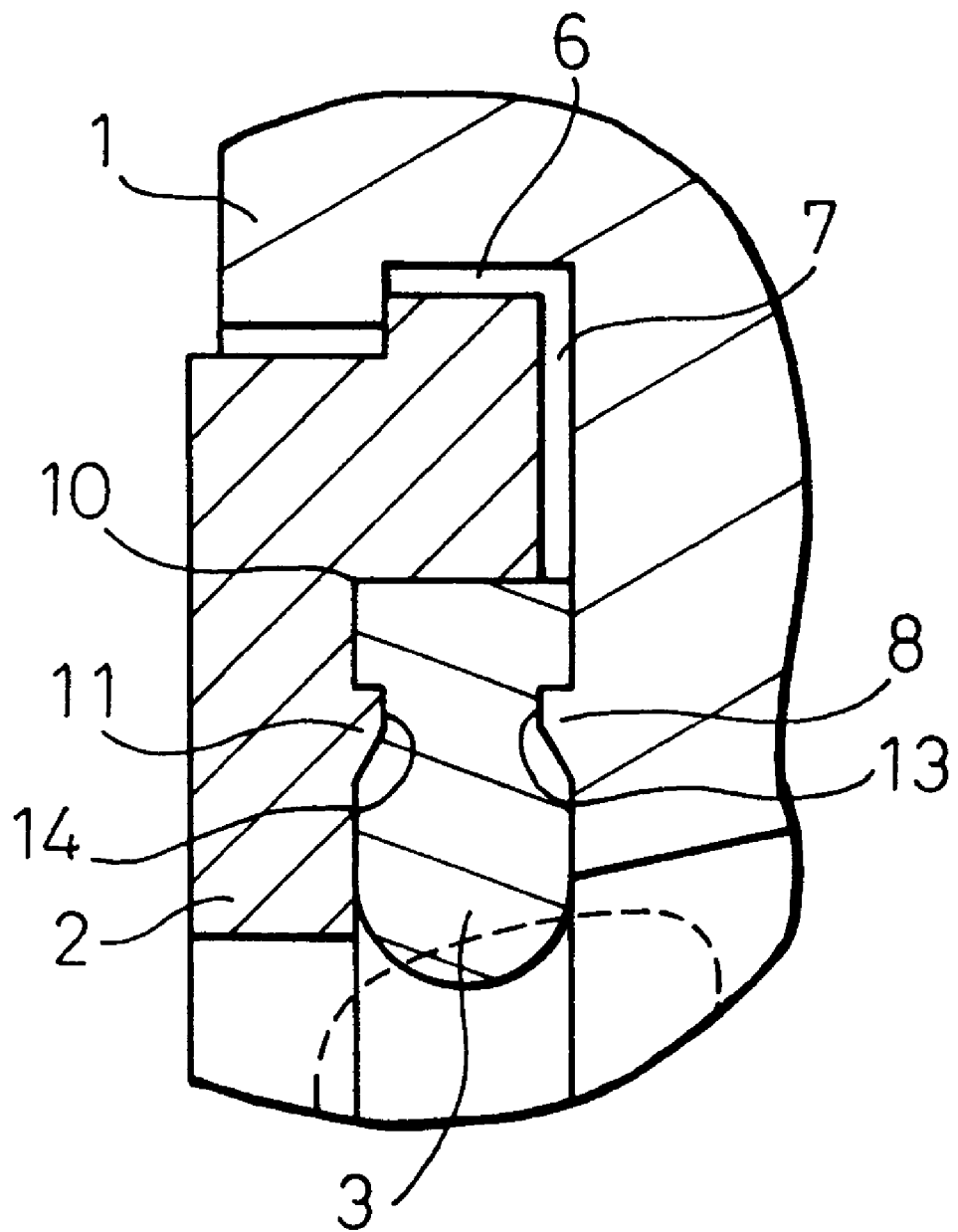
FIG. 2 is an enlarged longitudinal section of the essential parts in FIG. 1.
Figure 3:
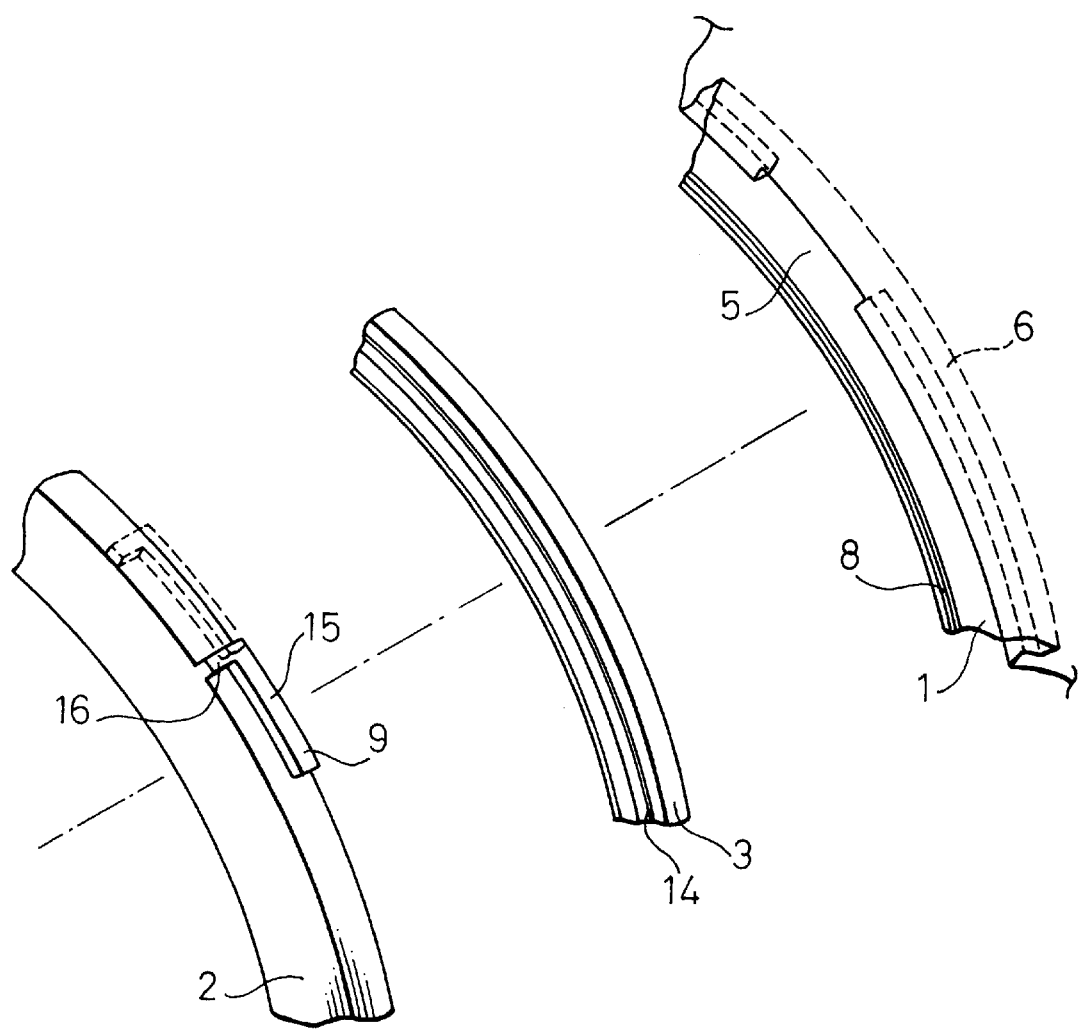
FIG. 3 is a partial exploded perspective view of the side portion of a body, a seat and a seat pressure foot.
Figure 4:
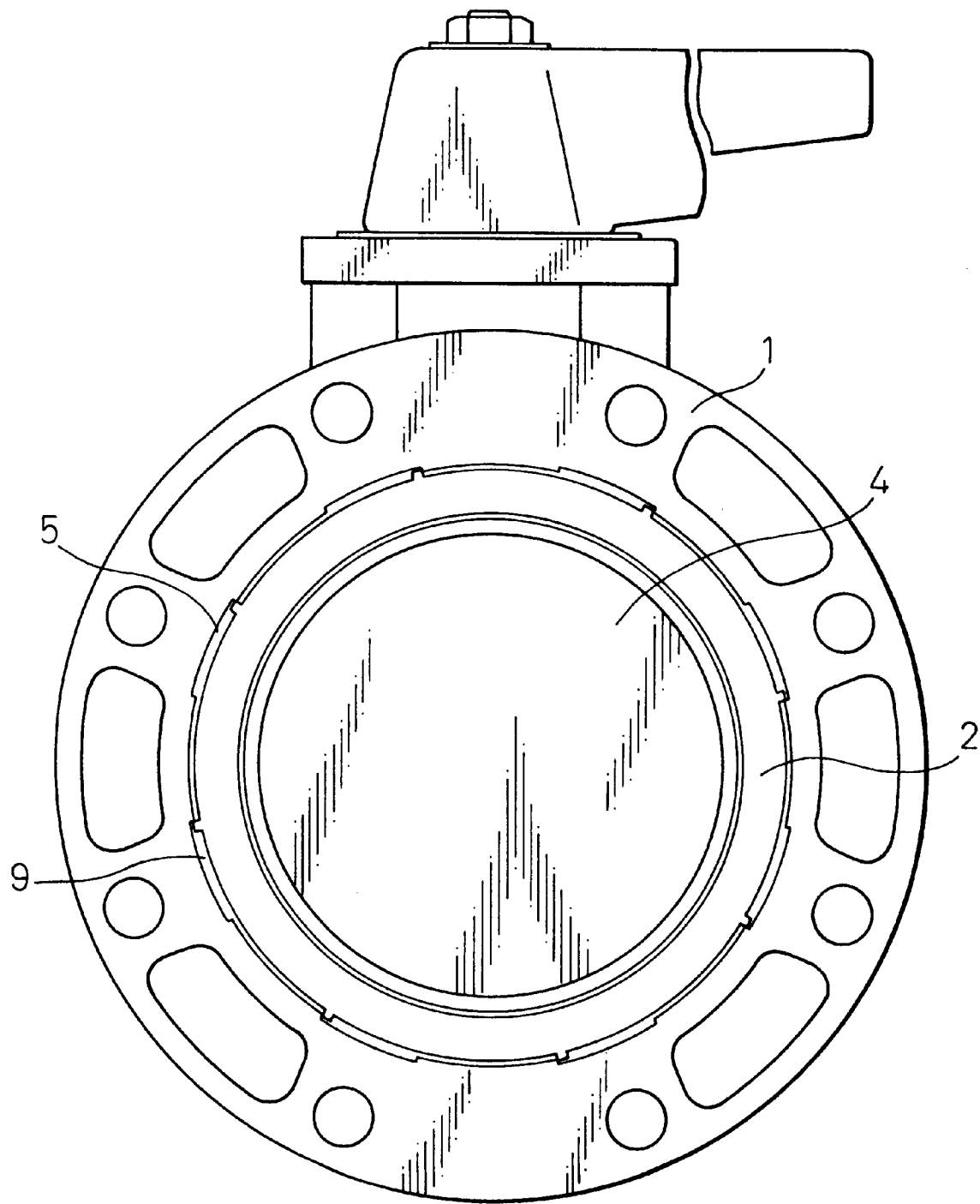
FIG. 4 is a left side view in FIG. 1.

Reference numeral 2 is a seat pressure foot on the outer peripheral end surface of which eight arcuate L-shaped projections 9 (FIG. 3) are provided, the projections being circumferentially arranged at an even spacing and integrally molded with the seat pressure foot, as shown in FIG. 4. Also, on the inner peripheral side of the seat pressure foot 2 is provided a step portion 10 for holding a seat 3 by fitting over the seat 3 as shown in FIG. 2. The depth in the axial direction of the step portion 10 is slightly smaller than the width of the seat 3 in the axial direction. That is, the depth of the step portion 10 is set up smaller by an interference in the axial direction of the seat 3. On the surface perpendicular to the axis of the step portion 10 is provided an annular small projection 11 of a trapezoidal cross-section for fixing the seat 3. Although the inner diameter of the seat pressure foot 2 is not specifically limited, making the contact area with the seat 3 as large as possible, in other words, setting the inner diameter of the seat pressure foot smaller than the inner diameter of the flow passage of the body 1 is more effective for safely holding the seat 3.

Reference numeral 7 is a cutout step portion of a circular hole arranged on one side of the body 1, which has the same diameter as the outer diameter of the seat pressure foot 2 and in which the seat pressure foot 2 and the seat 3 are fitted.

Reference numeral 5 is an arcuate cutout portion diametrically arranged on the cutout step portion 7 of the body in the position corresponding to the L-shaped projection 9 of the seat pressure foot 2, as shown in FIGS. 3 and 4. On the interior side of the cutout portion 5, that is, on the bottom periphery of the cutout step portion 7 is provided an annular engaging groove 6 of enlarged diameter in which the L-shaped projection 9 is circumferentially guided, as shown in FIG. 2. Further, on the bottom portion of the cutout step portion 7 is provided an annular small projection 8 in the position opposite to the small projection 11, similarly to the seat pressure foot 2.

Reference numeral 3 is a seat of a shell-like cross-section arranged perpendicularly to the axis of the flow passage of the body 1 and the inner peripheral surface of which is formed in an arcuate shape. The seat is pinched by the seat pressure foot 2 and the body 1 and is fixed on the interior of the body 1, that is, the bottom of the cutout step portion 7 of the body 1 by the seat pressure foot 2 (refer to FIGS. 1 and 2). As shown in FIG. 2, annular grooves 13 and 14 with which the small projections 8 and 11 are engaged are arranged on both outer peripheral sides of the seat 3. As seen in FIG. 1, the arcuate inner surface of the seat 3 projects toward the flow passage side of the body 1, thus, when the valve is completely closed, the periphery of the eccentrically arranged valve disk 4 and the inner surface of the seat 3 abut on each other so that the sealing can be maintained.

Then, the process of fitting the seat pressure foot 2 and the seat 3, according to the embodiment, into the cutout step portion 7 of the body 1 by the insertion/rotation means (that is the bayonet manner) will be explained below.

First, the seat 3 is fitted in the step portion 10 of the seat pressure foot 2, then the L-shaped projections 9 of the seat pressure foot 2 are fitted in the arcuate cutout portions 5 arranged on the cutout step portion 7 of the body 1 and are pushed in until the seat 3 comes in contact with the bottom of the cutout step portion 7. Next, the seat pressure foot 2 is circumferentially rotated to guide the parallel portions 15 of the L-shaped projections 9 in the engaging groove 6, and is further rotated until the vertical portions 16 of the L-shaped projections 9 come in contact with the walls of the cutout portions 5 of the body 1. (Refer to FIGS. 3 and 4. In FIG. 3, the state where the seat pressure foot 2 is rotated clockwise so that the L-shaped projection 9 is moved from the dotted line position to the position shown in FIG. 3 is, shown.)

In this state as shown in FIGS. 1 and 2, there is a clearance (that is an interference) between the seat pressure foot 2 and the bottom of the cutout portion 7 of the body 1. Thus, the seat pressure foot 2 projects by the clearance in the axial direction from the side portion 12 of the body 1 and the seat 3 is not pressed, where the seat 3 is held only by the engagement of the opposite projections 8, 11 and the annular grooves 13, 14 of the seat 3.

In this way, the seat pressure foot 2 and the seat 3 are fixed. As a matter of course, if an exchange of the seat 3 is required, the operation reverse to the above should be carried out.

Figure 5:
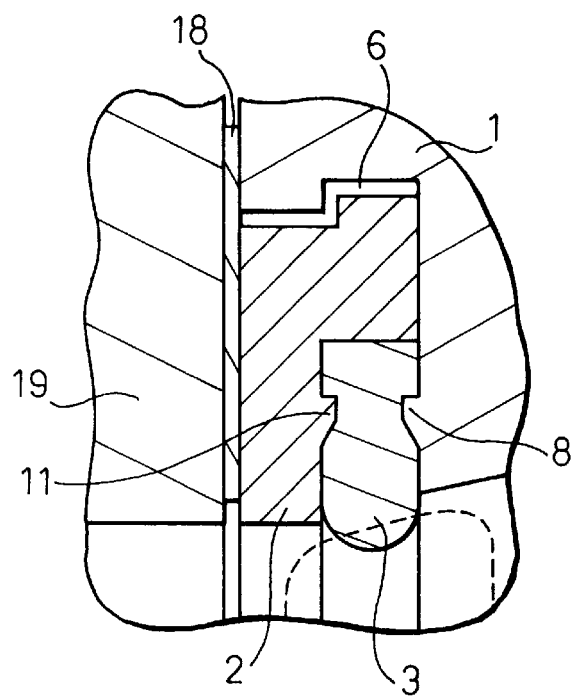
FIG. 5 is an enlarged longitudinal section of the essential parts when piping.

FIG. 5 is a longitudinal section of the essential parts showing the state of the seat pressure foot 2 and the seat 3 when the butterfly valve according to the embodiment is mounted.

The seat pressure foot 2 is pressed by a flange 19 etc. via a packing 18 so that the seat pressure foot 2 contacts with the bottom surface of the cutout step portion 7 of the body 1 and the seat 3 is strongly fixed due to the seat 3 being compressed by the moved amount of the seat, that is the interference of the seat 3.

Figure 6:
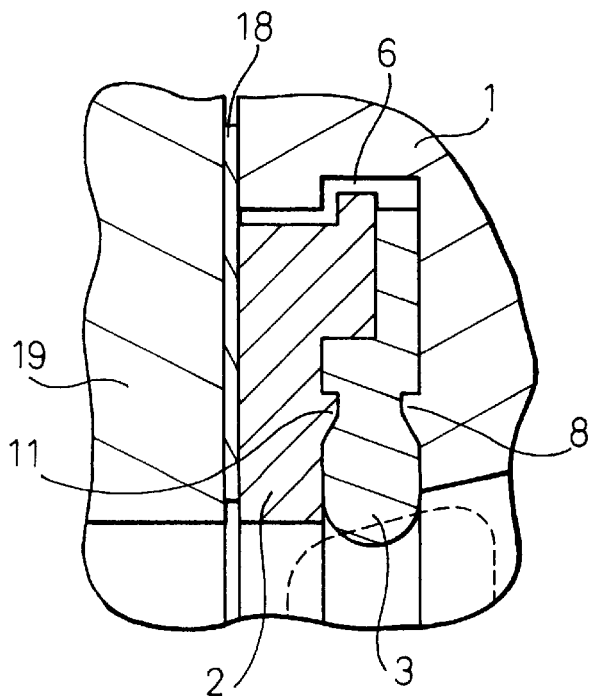
FIG. 6 is an enlarged sectional view of the essential parts including another embodiment of the seat when piping.
Figure 7:
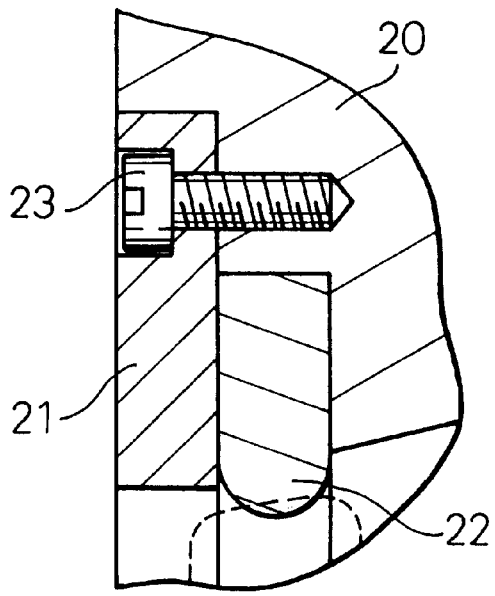
FIG. 7 is an enlarged longitudinal section of the essential parts of the seat mounting construction of a conventional metallic butterfly valve.
Figure 8:
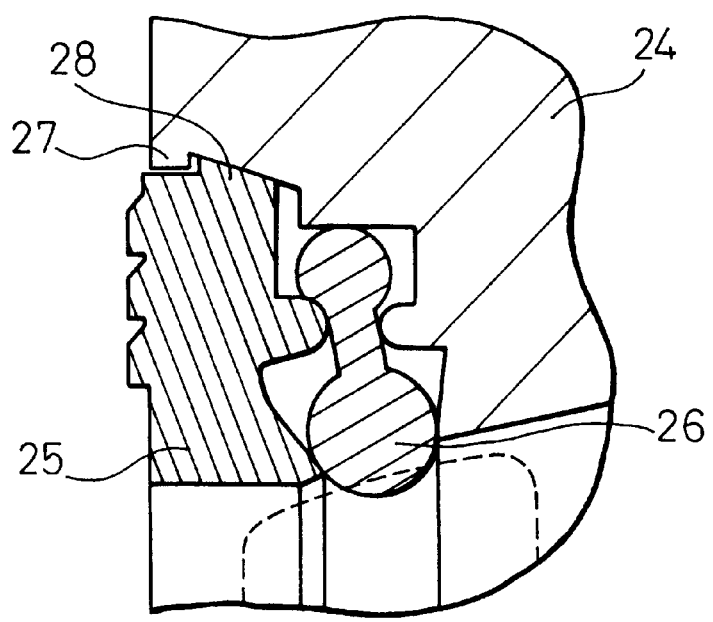
FIG. 8 is an enlarged longitudinal section of the essential parts of the seat mounting construction of a conventional plastic butterfly valve.

FIG. 6 is a longitudinal section of the essential parts showing another embodiment of the seat 3. The seat 3 according to the above first embodiment is further provided with a flange-like seal portion on the outer peripheral portion of the seat 3 so that the sealing performance between the body 1 and the seat pressure foot 2 is improved.

When the seat leakage inspection (water pressure test) corresponding to JIS B2003 was carried out using a plastic-butterfly valve having an opening diameter of 200A and the construction shown in FIG. 1, even if the water pressure was 10 kg/cm$^2$, 30(S), a leakage did not occur, and the sealing was fully maintained so that a result bearing comparison, with the conventional plastic butterfly valve was achieved. Thus, it was confirmed that the construction of the plastic butterfly valve according to the present invention has no problem regarding the sealing performance.

As stated above, since the plastic butterfly valve according to the present invention allows the seat pressure foot to be detachably fitted in the body by the insertion/rotation means (bayonet manner) to fix the seat, providing tapped holes for screwing the bolts is not required, there is no danger that the engaging portions are damaged when disassembled, the mounting and demounting of the seat can be rapidly carried out without using a special tool, and the costs for production and maintenance can be reduced. Also, since the butterfly valve is made of plastic, and there are obtained the effects that the butterfly valve is light and is superior in corrosion resistance.

Exploitation in Industry

The present invention is preferably applicable to chemical plants and piping lines in a city water supply.

What is claimed is:

1. A plastic butterfly valve comprising a hollow cylindrical body in which an annular seat is fixed on an inner peripheral surface of a flow passage of the body by a seat pressure foot, a valve disk rotatably and eccentrically supported at a stem of the valve disk within the body to abut a periphery of the valve disk on the annular seat, and means for detachably fitting the seat pressure foot into one side of the body by inserting and rotating the seat pressure foot.

2. A plastic butterfly valve as set forth in claim 1, wherein said means comprise a plurality of arcuate projections arranged on an outer peripheral end surface of the seat pressure foot, a cutout step portion arranged on a side portion of the body to enable the seat pressure foot and the seat to be fitted in the cutout step portion, a plurality of arcuate cutout portions arranged at positions corresponding to the projections in the body to enable the projections to be inserted, and a plurality of arcuate engaging grooves arranged subsequently to the cutout portions on more interior sides of the cutout portions to guide the projections circumferentially.

3. A plastic butterfly valve as set forth in claim 2, including a clearance between the seat pressure foot and a bottom portion of the cutout step portion of the body when the seat pressure foot and the seat are incorporated in the side portion of the body.

4. A plastic butterfly valve as set forth in claim 2, wherein an outer periphery of the seat is further provided with a flange-like seal portion.

5. A plastic butterfly valve as set forth in claim 1, wherein an inner diameter of the seat pressure foot is smaller than an inner diameter of the flow passage of the body.

6. A plastic butterfly valve as set forth in claim 1, wherein side surfaces of the seat pressure foot and the body are respectively provided with projections for fixing the seat.

7. A plastic butterfly valve as set forth in claim 6, wherein both side surfaces of the seat are provided with annular grooves to engage with said projections on the side surfaces of the seat pressure foot and the body.

8. A plastic butterfly valve as set forth in claim 7, wherein the seat is held only by said projections on the side surfaces of the seat pressure foot and the body and by said annular grooves when the seat pressure foot and the seat are incorporated in the side portion of the body.

9. A plastic butterfly valve as set forth in claim 1, wherein the plastic is hard vinyl chloride resin, polypropylene, or a fluorocarbon resin.

10. A plastic butterfly valve comprising a hollow cylindrical body provided with a flow passage having an inner peripheral surface, an annular seat fixed on the inner peripheral surface of the flow passage by a seat pressure foot, and a valve disk having a periphery and a stem, the valve disk being rotatably and eccentrically supported within the body at the stem of the valve disk to abut the periphery of the valve disk on the annular seat, said seat pressure foot being detachably fitted into one side of the body in the absence of threaded fastening elements by means for inserting and rotating the seat pressure foot.

11. A plastic butterfly valve as set forth in claim 10, wherein said means includes a plurality of arcuate projections arranged on an outer peripheral end surface of the seat pressure foot, a cutout step portion arranged on a side portion of the body to enable the seat pressure foot and the seat to be fitted in the cutout step portion, a plurality of arcuate cutout portions arranged at positions corresponding to the projections in the body to enable the projections to be inserted, and a plurality of arcuate engaging grooves arranged subsequently to the cutout portions on more interior sides of the cutout portions to guide the projections circumferentially.

12. A plastic butterfly valve as set forth in claim 11, including a clearance between the seat pressure foot and a bottom portion of the cutout step portion of the body when the seat pressure foot and the seat are incorporated in the side portion of the body.

13. A plastic butterfly valve as set forth in claim 11, wherein an outer periphery of the seat is further provided with a flange-like seal portion.

14. A plastic butterfly valve as set forth in claim 10, wherein an inner diameter of the seat pressure foot is smaller than an inner diameter of the flow passage of the body.

15. A plastic butterfly valve as set forth in claim 10, wherein side surfaces of the seat pressure foot and the body are respectively provided with projections for fixing the seat.

16. A plastic butterfly valve as set forth in claim 15, wherein both side surfaces of the seat are provided with annular grooves to engage with said projections on the side surfaces of the seat pressure foot and the body.

17. A plastic butterfly valve as set forth in claim 16, wherein the seat is held only by said projections on the side surfaces of the seat pressure foot and the body and by said annular grooves when the seat pressure foot and the seat are incorporated in the side portion of the body.

18. A plastic butterfly valve as set forth in claim 10, wherein the plastic is hard vinyl chloride resin, polypropylene, or a fluorocarbon resin.

\* \* \* \* \*